(12) United States Patent  (10) Patent No.: US 8,717,705 B1
Yamada et al.  (45) Date of Patent: May 6, 2014

(54) MAGNETIC RECORDING HEAD AND MAGNETIC RECORDING APPARATUS INCLUDING THE SAME

(71) Applicant: Kabushiki Kaisha Toshiba, Tokyo (JP)

(72) Inventors: Kenichiro Yamada, Tokyo (JP); Naoyuki Narita, Fuchu (JP); Katsuhiko Koui, Yokohama (JP); Akihiko Takeo, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/896,769

(22) Filed: May 17, 2013

(30) Foreign Application Priority Data

Dec. 21, 2012 (JP) ................................. 2012-280160

(51) Int. Cl.
*G11B 5/31* (2006.01)
(52) U.S. Cl.
USPC ..................................................... 360/97.11
(58) Field of Classification Search
USPC ..................................................... 360/97.11
See application file for complete search history.

(56) References Cited

U.S. PATENT DOCUMENTS

| 7,957,098 | B2 | 6/2011 | Yamada et al. |
| 8,164,854 | B2 | 4/2012 | Takagishi et al. |
| 8,238,060 | B2 | 8/2012 | Yamada et al. |
| 8,295,009 | B2 | 10/2012 | Yamada et al. |
| 8,400,734 | B2 | 3/2013 | Yamada et al. |
| 8,446,691 | B2 * | 5/2013 | Takagishi et al. .......... 360/125.3 |
| 8,456,967 | B1 * | 6/2013 | Mallary ..................... 369/13.33 |
| 8,462,461 | B2 * | 6/2013 | Braganca et al. .......... 360/125.3 |
| 8,467,150 | B2 * | 6/2013 | Takeo et al. ................ 360/125.3 |
| 8,472,135 | B1 * | 6/2013 | Kusukawa et al. ............ 360/110 |
| 8,477,453 | B2 * | 7/2013 | Takano et al. ............ 360/125.14 |
| 8,508,885 | B2 * | 8/2013 | Matsumoto et al. ....... 360/125.3 |
| 8,537,497 | B2 * | 9/2013 | Nagasaka et al. .......... 360/125.3 |
| 8,553,359 | B2 * | 10/2013 | Yamada et al. ......... 360/125.02 |
| 8,564,904 | B2 * | 10/2013 | Iwasaki et al. ............. 360/125.3 |
| 2009/0080109 | A1 | 3/2009 | Fukuzawa et al. |
| 2012/0113542 | A1 | 5/2012 | Igarashi et al. |

FOREIGN PATENT DOCUMENTS

| JP | 2008-305486 A | 12/2008 |
| JP | 2009-070541 A | 4/2009 |
| JP | 2009-080904 A | 4/2009 |
| JP | 2012-104168 A | 5/2012 |

* cited by examiner

*Primary Examiner* — Mark Blouin
(74) *Attorney, Agent, or Firm* — Knobbe Martens Olson & Bear LLP

(57) ABSTRACT

According to one embodiment, a magnetic recording head includes a facing surface configured to face a recording medium, a main magnetic pole configured to apply a recording magnetic field to a recording layer of the recording medium, and a high-frequency oscillator disposed near to a trailing side of the main magnetic pole and configured to apply a high-frequency magnetic field to the recording layer. An angle defined between a recording magnetic field applied from the main magnetic pole to the recording medium and the facing surface is 0 to 85° in a region between a trailing side end of the main magnetic pole and a trailing side end of the high-frequency oscillator.

14 Claims, 16 Drawing Sheets

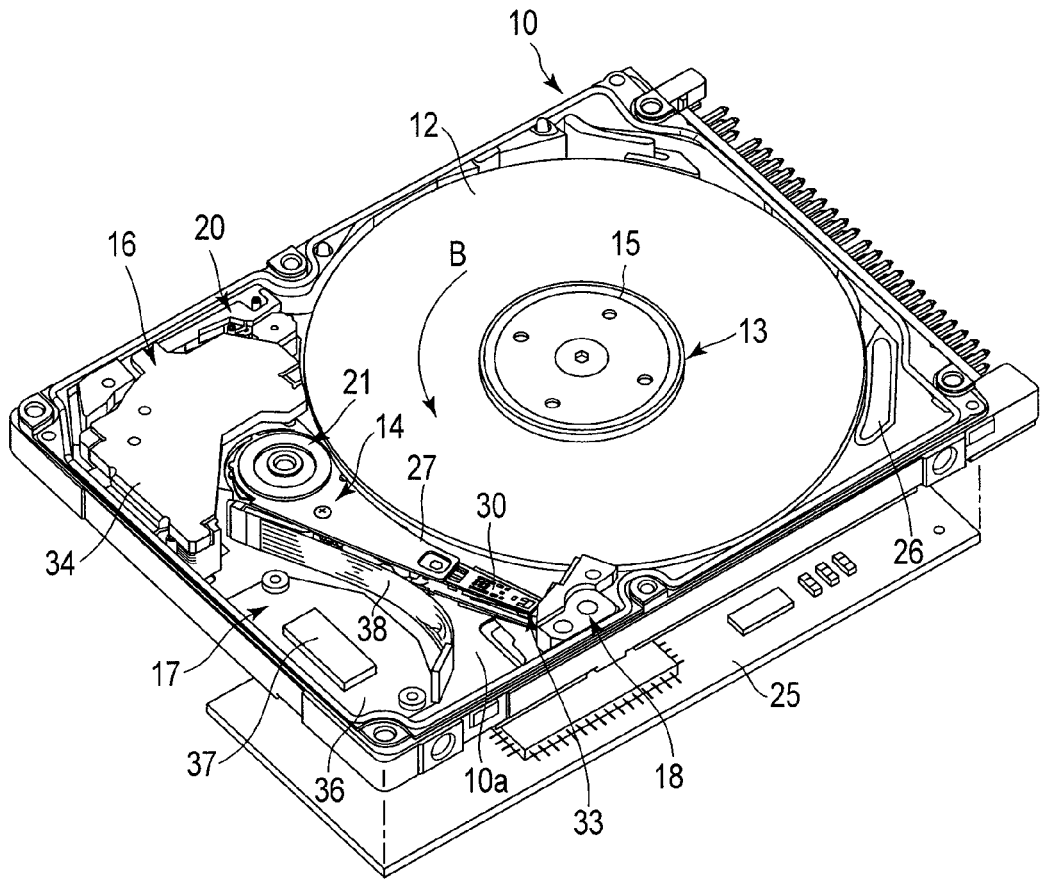
F I G. 1
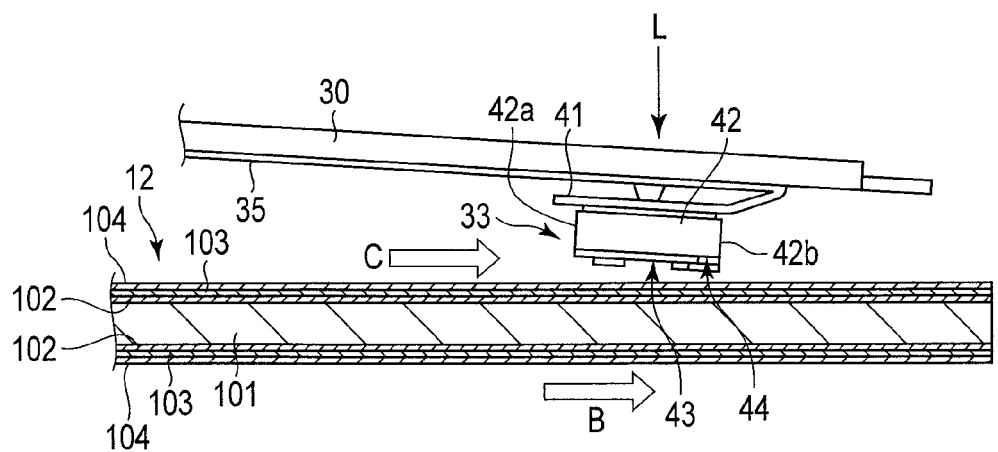
F I G. 2

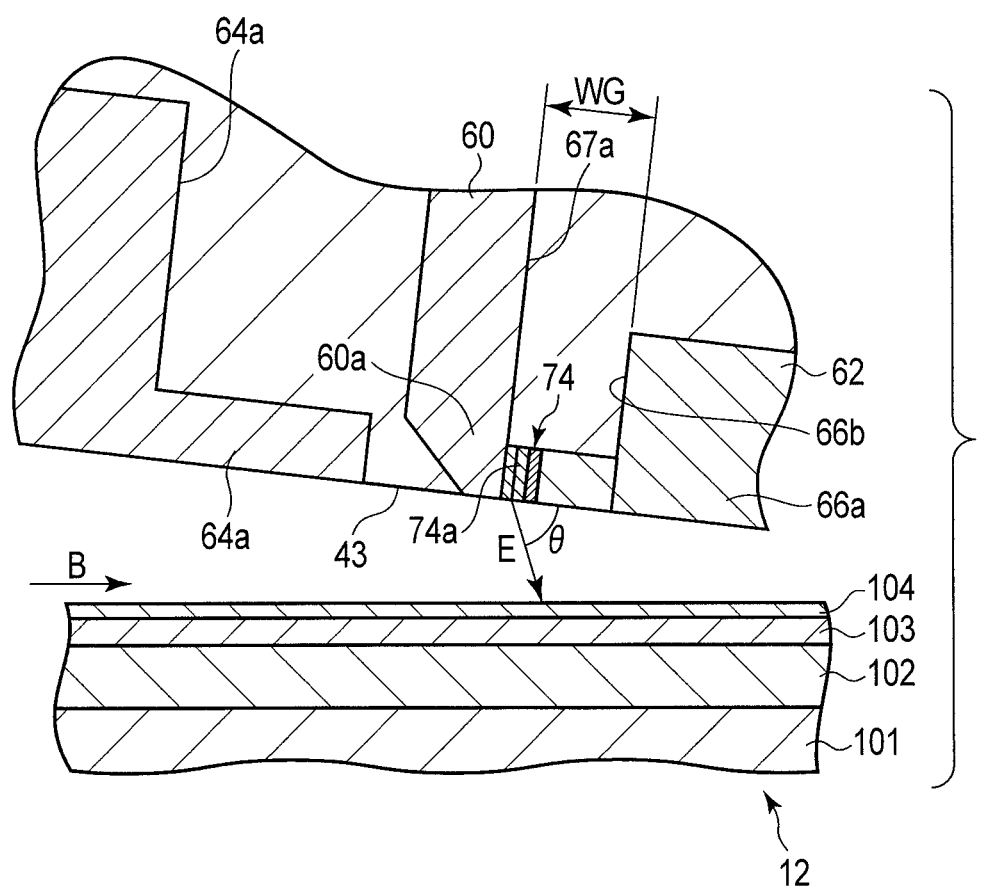
F I G. 5

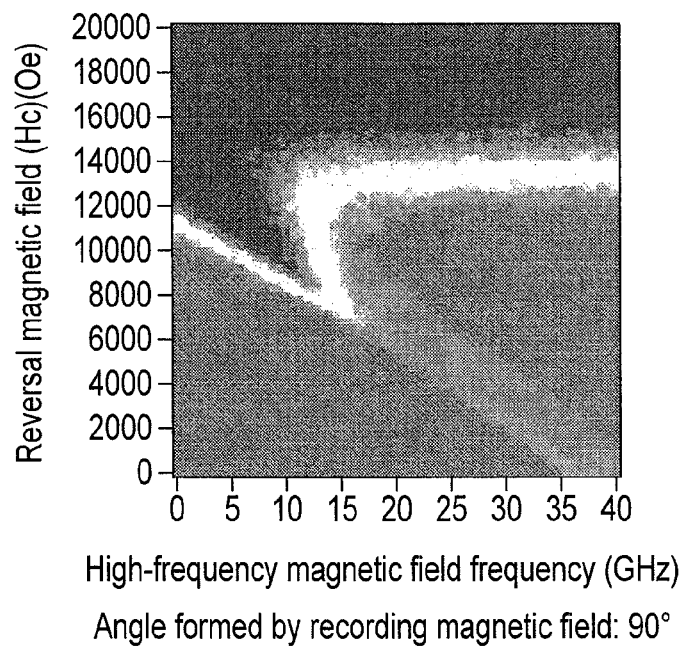
Angle formed by recording magnetic field: 90°
F I G. 6A
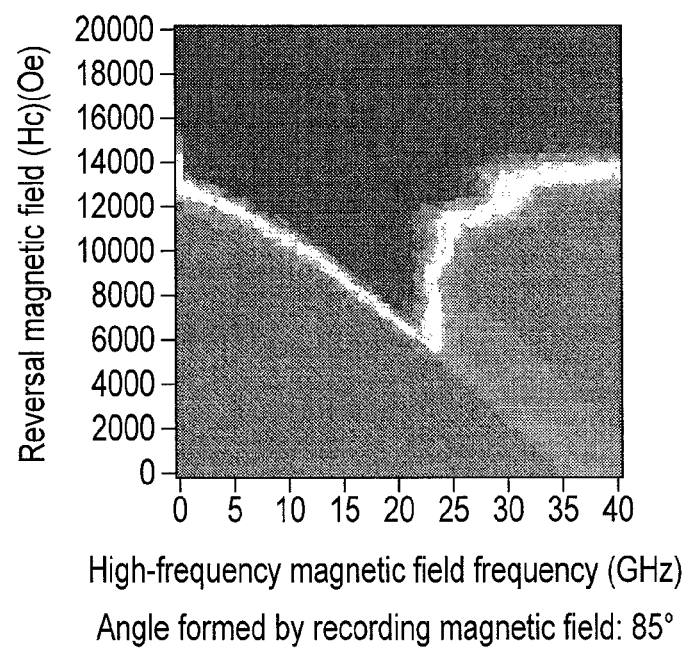
Angle formed by recording magnetic field: 85°
F I G. 6B

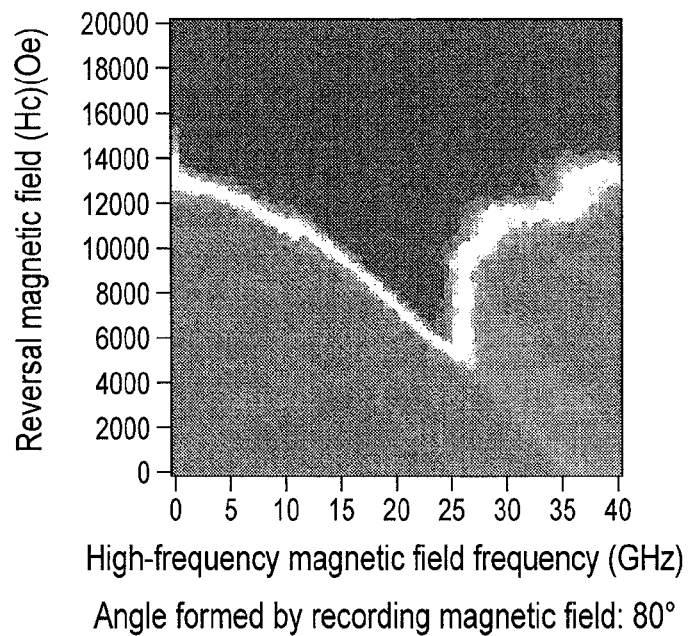
High-frequency magnetic field frequency (GHz)
Angle formed by recording magnetic field: 80°
F I G. 6C
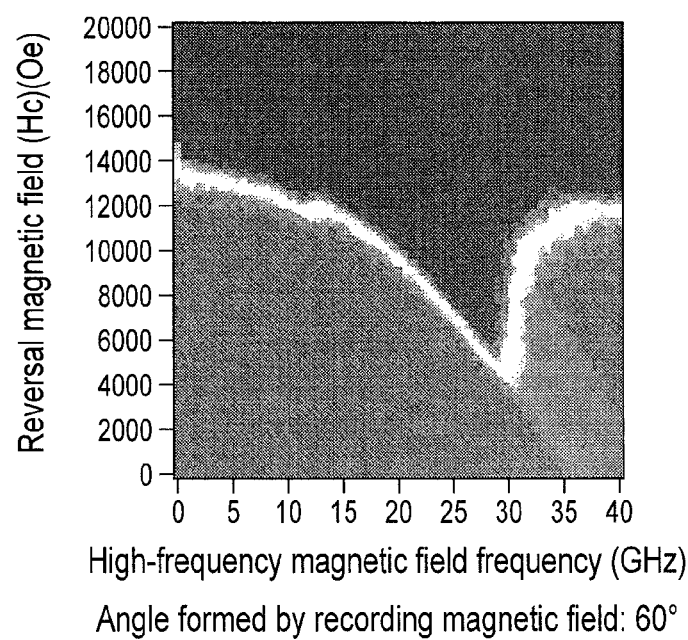
High-frequency magnetic field frequency (GHz)
Angle formed by recording magnetic field: 60°
F I G. 6D

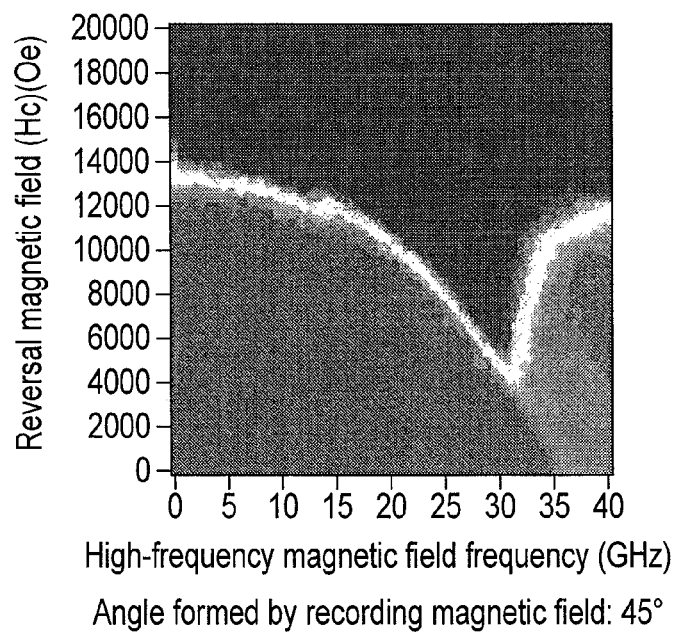
High-frequency magnetic field frequency (GHz)
Angle formed by recording magnetic field: 45°
F I G. 6E
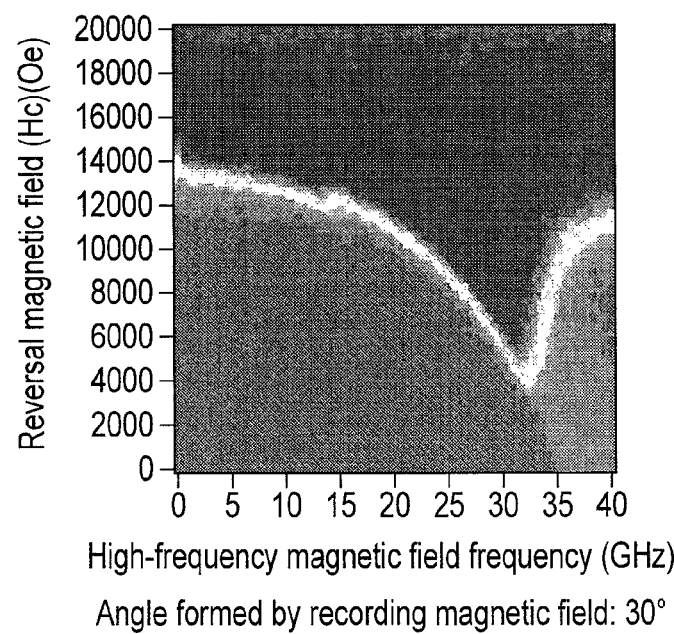
High-frequency magnetic field frequency (GHz)
Angle formed by recording magnetic field: 30°
F I G. 6F

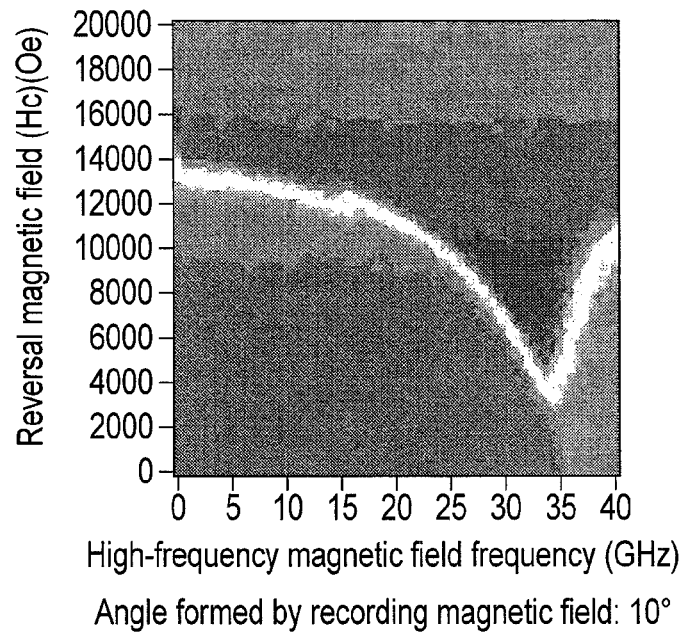
High-frequency magnetic field frequency (GHz)
Angle formed by recording magnetic field: 10°
F I G. 6G
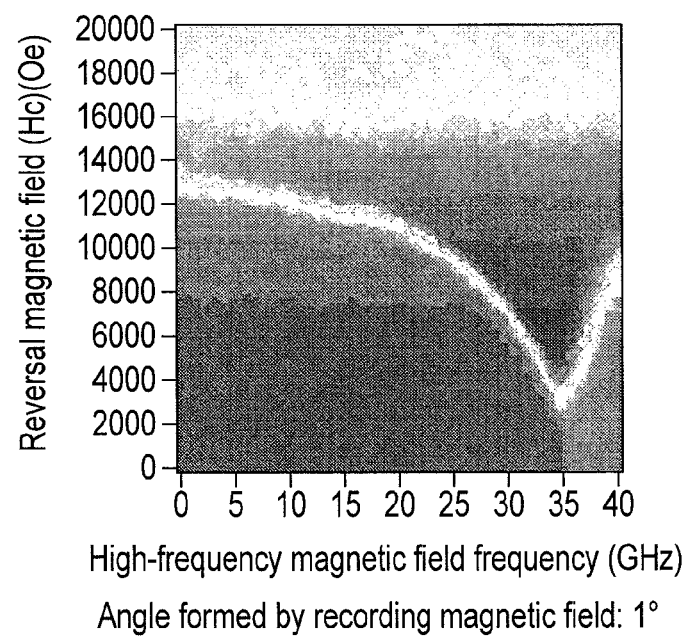
High-frequency magnetic field frequency (GHz)
Angle formed by recording magnetic field: 1°
F I G. 6H

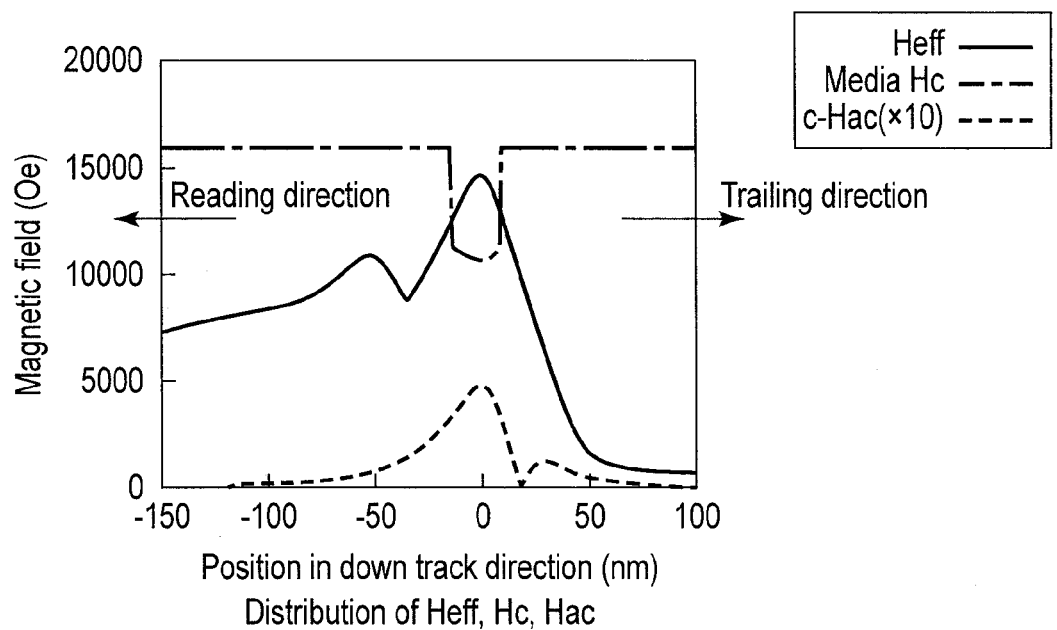
F I G. 8A
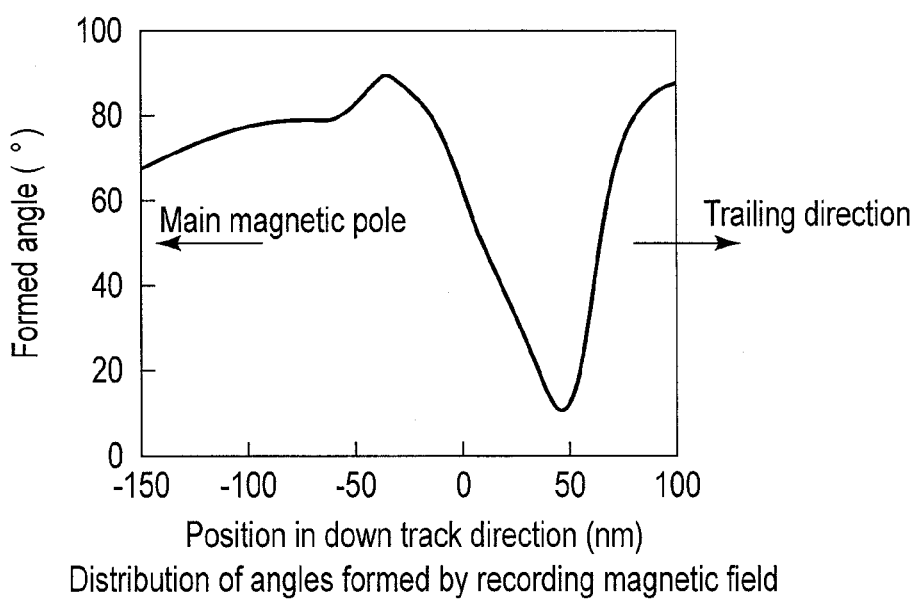
F I G. 8B

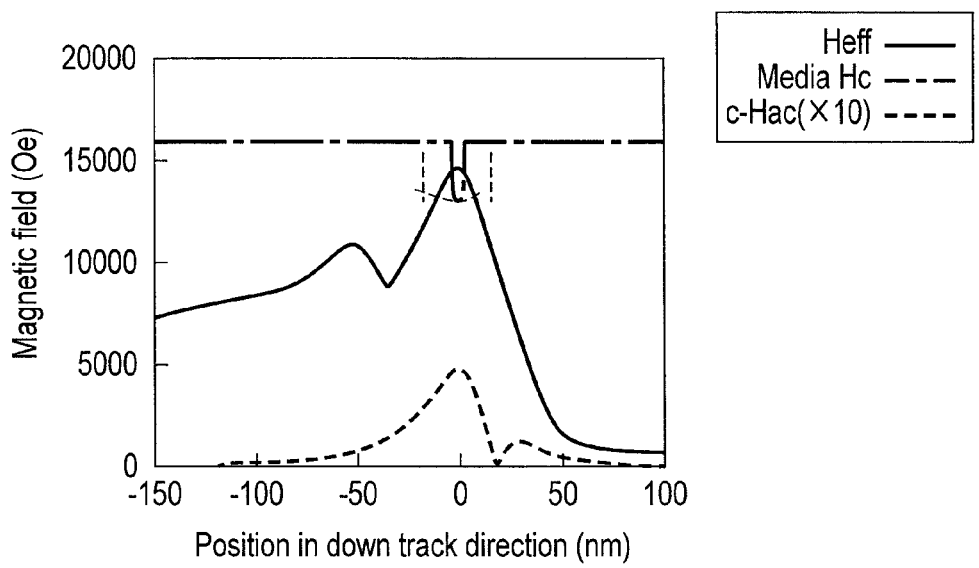
Comparative example: Distribution of Heff, Hc, Hac
Angle formed by recording magnetic field: assumed as 90°
F I G. 8C
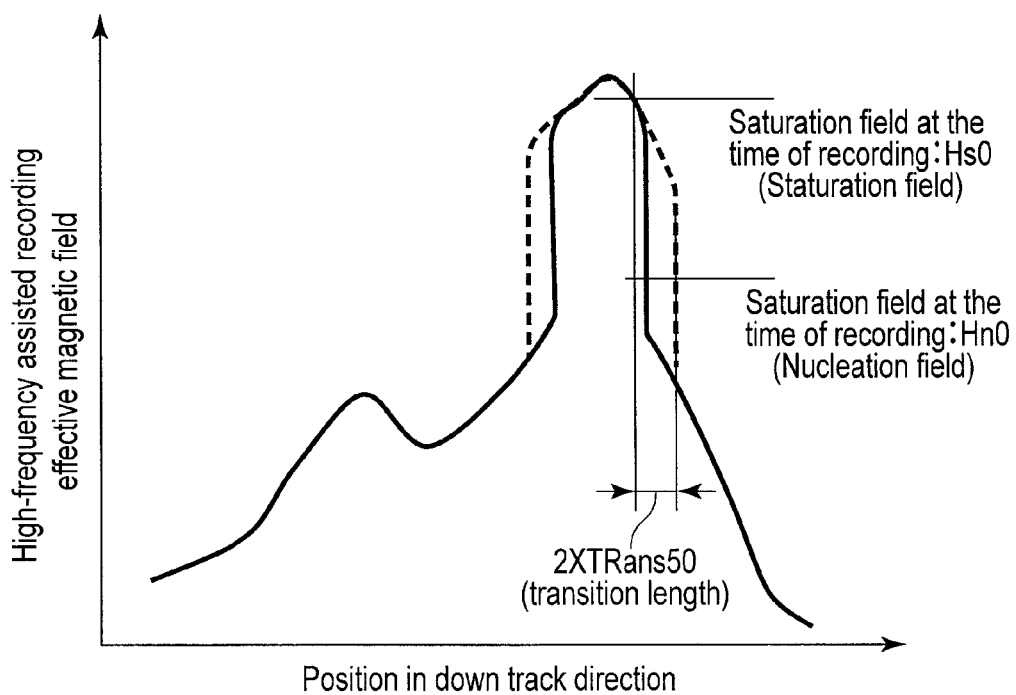
F I G. 9

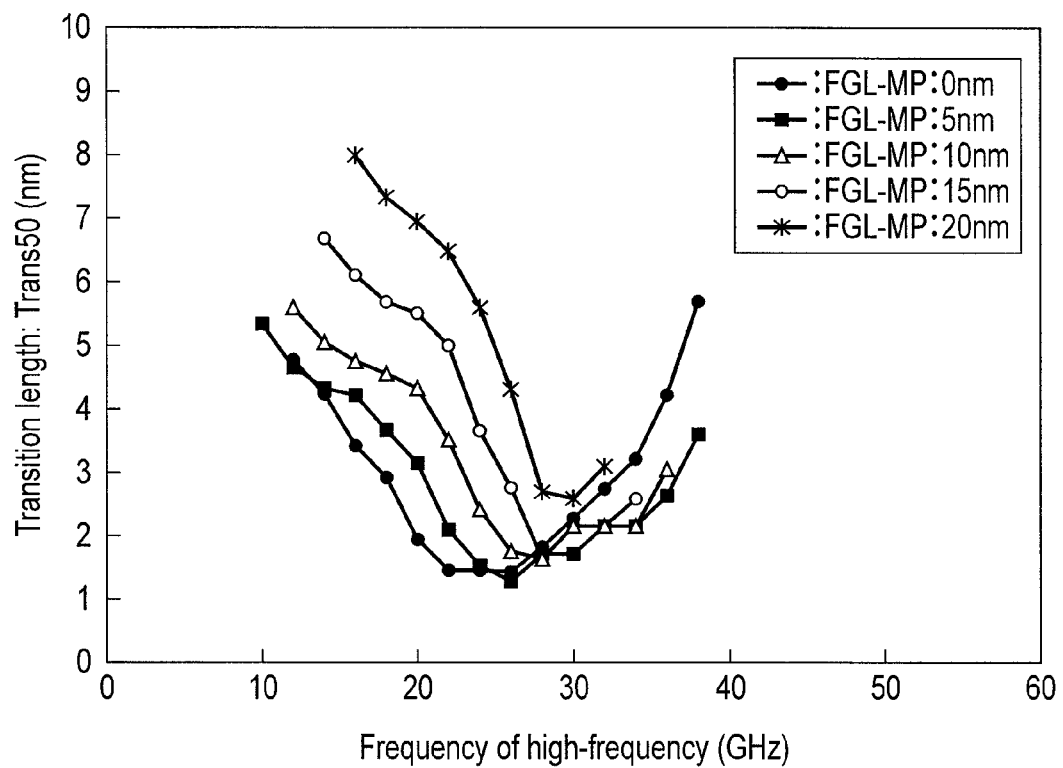
Dependence between transition length (Trans50) and frequency of high-frequency
Distances from various FGL surfaces to main magnetic pole are 0, 5, 10, 15, 20 nm
F I G. 11

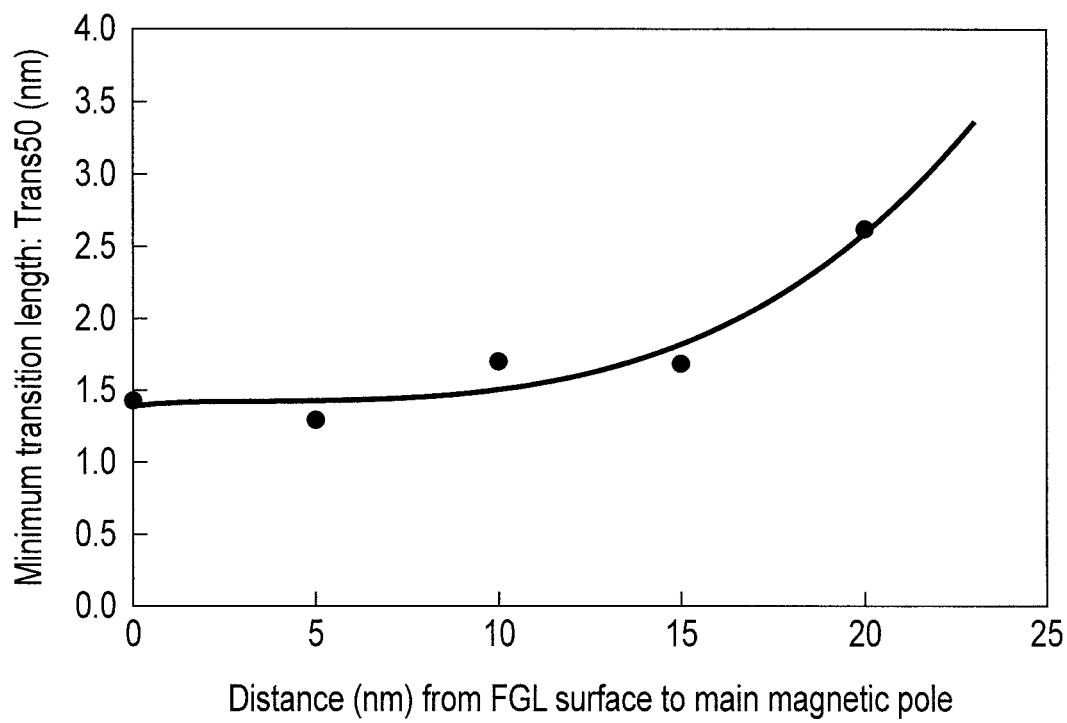
F I G. 12

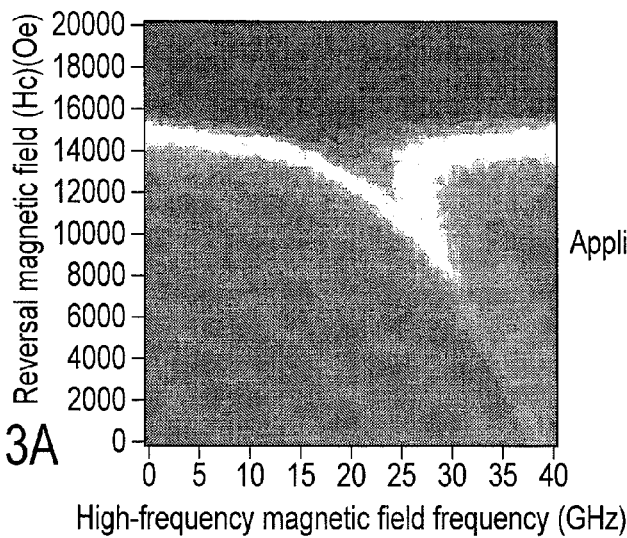
F I G. 13A
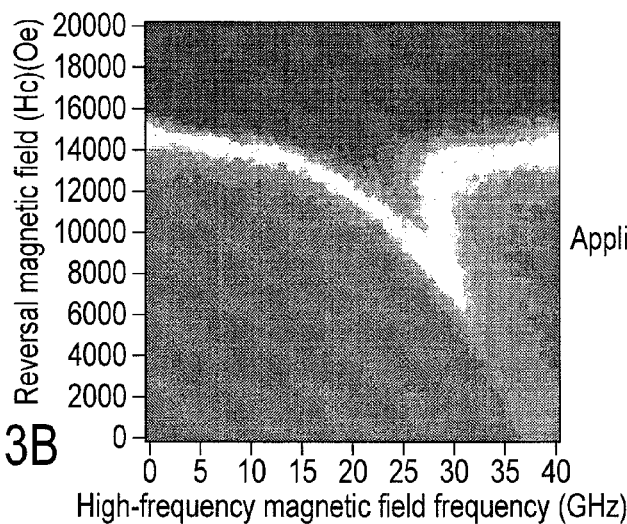
F I G. 13B
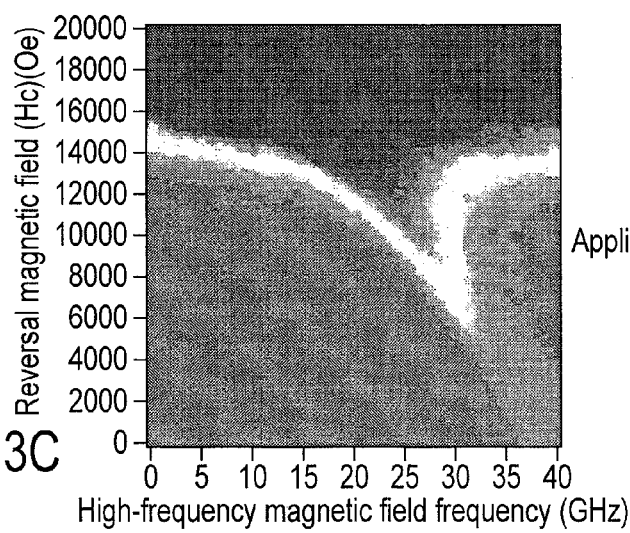
F I G. 13C

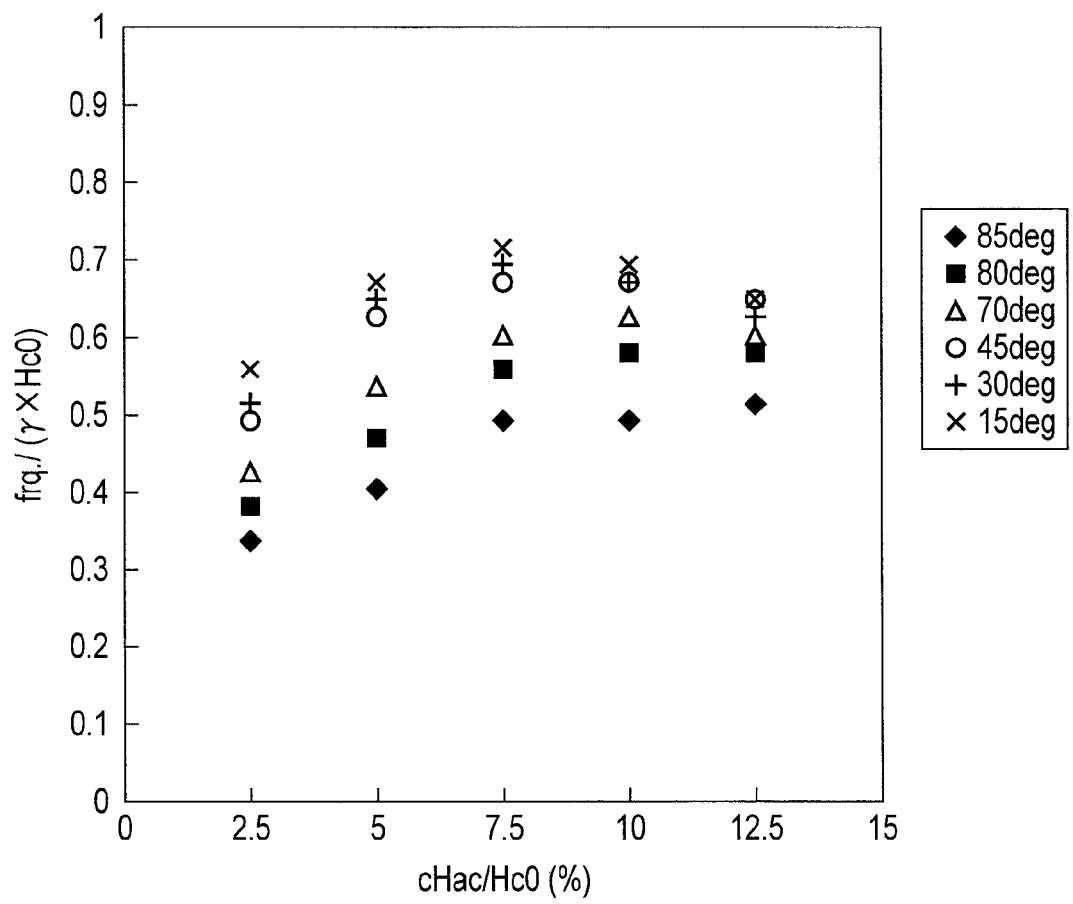
F I G. 14

MAGNETIC RECORDING HEAD AND MAGNETIC RECORDING APPARATUS INCLUDING THE SAME

CROSS-REFERENCE TO RELATED APPLICATIONS

This application is based upon and claims the benefit of priority from Japanese Patent Application No. 2012-280160, filed Dec. 21, 2012, the entire contents of which are incorporated herein by reference.

FIELD

Embodiments described herein relate generally to a high-frequency assisted magnetic recording head used for a magnetic recording apparatus and a magnetic recording apparatus including the magnetic recording head.

BACKGROUND

As a magnetic recording apparatus, for example, a magnetic disk apparatus comprises a magnetic disk, a spindle motor for supporting and rotating the magnetic disk, a magnetic head for reading/writing information from and to the magnetic disk, and a carriage assembly for movably supporting the magnetic head to the magnetic disk, which are arranged in a case. The magnetic head has a slider attached to a suspension and a head section in the slider, and the head section includes a recording head for writing and a reproducing head for reading.

To increase the recording density and the capacity of a magnetic disk apparatus and to reduce the size thereof, there is proposed a perpendicular magnetic recording magnetic head. Further, there is proposed a high-frequency assisted recording head wherein a high-frequency oscillator is provided in the vicinity of a main magnetic pole and a high-frequency magnetic field is applied from the high-frequency oscillator to a recording medium.

The high-frequency assisted recording head and the magnetic recording apparatus can execute recording to a recording medium having a large coercive force. However, recently, it is required to further improve a recording density.

BRIEF DESCRIPTION OF THE DRAWINGS

FIG. 1 is a perspective view illustrating a hard disk drive (hereinafter, called HDD) according to an embodiment;

FIG. 2 is a side view illustrating a magnetic head and a suspension in the HDD;

FIG. 5 is an enlarged sectional view illustrating a disk side end of the recording head;

FIG. 6A is a view illustrating the relation between the high-frequency magnetic field frequency of a recording head and the reversal magnetic field thereof when a recording magnetic field has an angle of 90°;

FIG. 6B is a view illustrating the relation between the high-frequency magnetic field frequency of a recording head and the reversal magnetic field thereof when a recording magnetic field has an angle of 85°;

FIG. 6C is a view illustrating the relation between the high-frequency magnetic field frequency of a recording head and the reversal magnetic field thereof when a recording magnetic field has an angle of 80°;

FIG. 6D is a view illustrating the relation between the high-frequency magnetic field frequency of a recording head and the reversal magnetic field thereof when a recording magnetic field has an angle of 60°;

FIG. 6E is a view illustrating the relation between the high-frequency magnetic field frequency of a recording head and the reversal magnetic field thereof when a recording magnetic field has an angle of 45°;

FIG. 6F is a view illustrating the relation between the high-frequency magnetic field frequency of a recording head and the reversal magnetic field thereof when a recording magnetic field has an angle of 30°;

FIG. 6G is a view illustrating the relation between the high-frequency magnetic field frequency of a recording head and the reversal magnetic field thereof when a recording magnetic field has an angle of 10°;

FIG. 6H is a view illustrating the relation between the high-frequency magnetic field frequency of a recording head and the reversal magnetic field thereof when a recording magnetic field has an angle of 1°;

FIG. 8A is a view illustrating an effective magnetic field intensity (Heff) by a recording head of the embodiment, a high-frequency magnetic field intensity (c-Hac) by a spin torque oscillator, and the profile of a reversal magnetic field (Hc) along a down track direction;

FIG. 8B is a view illustrating the distribution of the angles formed by the effective magnetic field intensity (Heff) along the down track direction;

FIG. 8C is a view illustrating an effective magnetic field intensity (Heff) by a recording head 58 of the embodiment, a high-frequency magnetic field intensity (c-Hac) by a spin torque oscillator 74, and the profile of a reversal magnetic field (Hc) along the down track direction when it is assumed that the angle θ formed between a recording magnetic field and an ABS is 90° as a comparative example;

FIG. 9 is a view illustrating a result of calculation of the distribution of the high-frequency assisted recording magnetic fields of the recording head of the embodiment in the down track direction;

FIG. 11 is a view illustrating a result of determination of the relation between a transition length (Trans50) and the frequency of a high-frequency determined using a recording medium having a nucleation field (HnO) of 13 kOe and saturation field (HsO) of 17 kOe;

FIG. 12 is a view illustrating the dependence of a minimum transition length (Trans50) and the distance from a surface of an oscillation layer to a main magnetic pole;

FIG. 13A is a view illustrating the relation between the dependence of a reversal magnetic field on the frequency of a high-frequency magnetic field and a recording magnetic field application time;

FIG. 13B is a view illustrating the relation between the dependence of a reversal magnetic field on the frequency of a high-frequency magnetic field and a recording magnetic field application time;

FIG. 13C is a view illustrating the relation between the dependence of a reversal magnetic field on the frequency of a high-frequency magnetic field and a recording magnetic field application time; and FIG. 14 is a view illustrating the relation between the oscillation frequency f of an assist-maximized spin torque oscillator standardized by a reversal magnetic field (HcO) without a high-frequency assist by a spin torque oscillator and a high-frequency magnetic field intensity (c-Hac) standardized by HcO.

DETAILED DESCRIPTION

Figure 3:
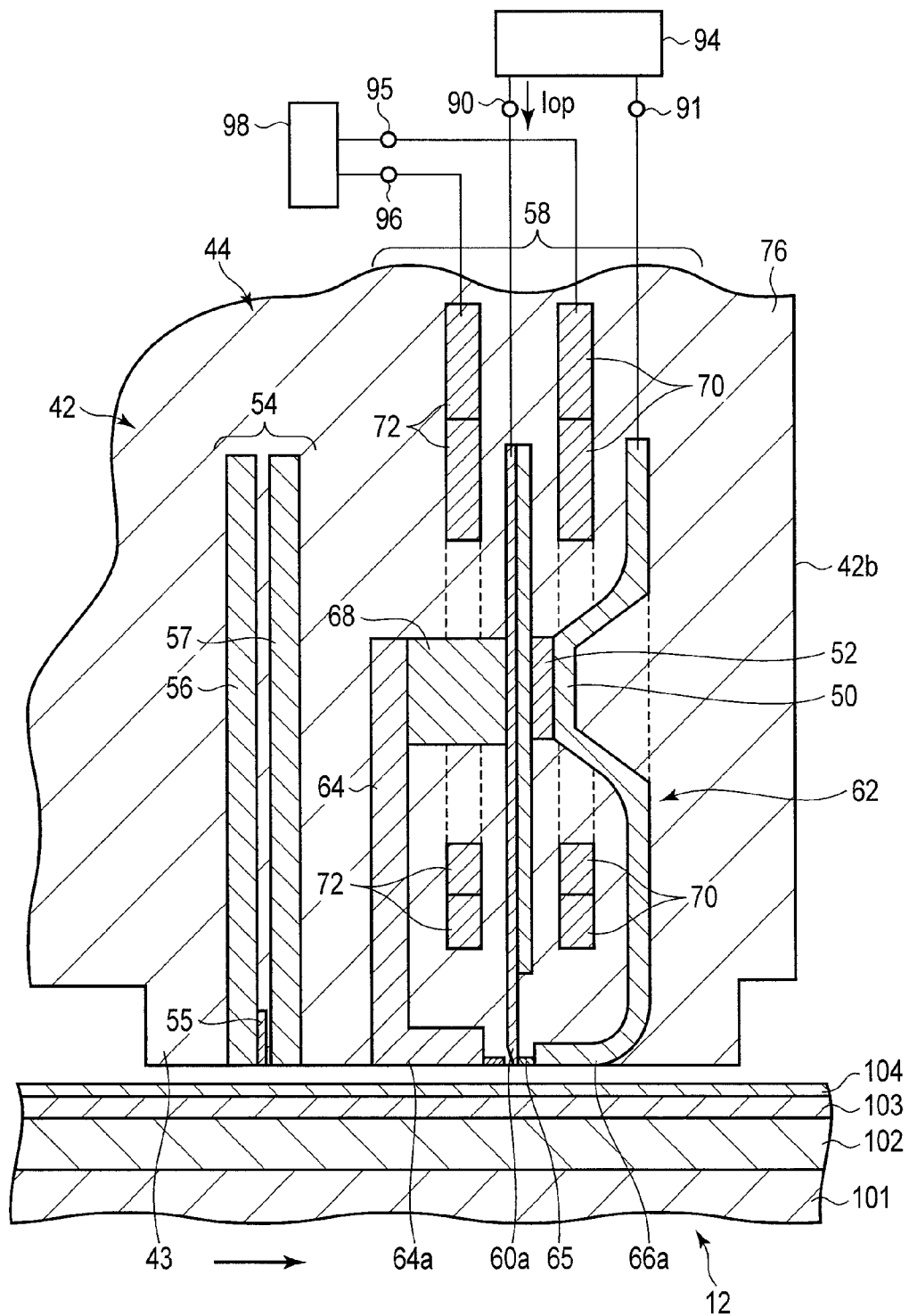
FIG. 3 is an enlarged sectional view illustrating a head section of the magnetic head.

Various embodiments will be described hereinafter with reference to the accompanying drawings. In general, according to one embodiment, a magnetic recording head comprises: a facing surface configured to face a recording medium; a main magnetic pole including an extreme end exposed to the facing surface and configured to apply a recording magnetic field to a recording layer of the recording medium; and a high-frequency oscillator disposed near to a trailing side of the main magnetic pole and configured to apply a high-frequency magnetic field to the recording layer. An angle defined between a recording magnetic field applied from the main magnetic pole to the recording medium and the facing surface is 0 to 85° in a region between a trailing side end of the main magnetic pole and a trailing side end of the high-frequency oscillator.

FIG. 1 illustrates an internal structure of a HDD according to an embodiment, wherein a top cover is removed, and FIG. 2 illustrates a magnetic head in a flying state. As shown in FIG. 1, the HDD as a magnetic recording apparatus comprises a case 10. The case 10 includes a rectangular box-shaped base 10a with an upper opening and an rectangular plate-shaped top cover (not shown). The top cover is fixed to the base 10a by plural screws and closes the upper opening of the base. The interior of the case 10 is kept air tight and can communicate with the outside only through a breathing filter 26.

A magnetic disk 12 as a recording medium and a mechanical unit are disposed on the base 10a. The mechanical unit includes a spindle motor 13 for supporting and rotating the magnetic disk 12, plural, for example, two magnetic heads 33 for recording and reproducing information to and from the magnetic disk, a head actuator 14 for movably supporting the magnetic heads 33 with respect to a surface of the magnetic disk 12, and a voice coil motor (hereinafter, called VCM) 16 for rotating and positioning the head actuator. Further, arranged on the base 10a are a ramp load mechanism 18 for holding the magnetic heads 33 at a position away from the magnetic disk 12 when the magnetic heads 33 move to the outermost periphery of the magnetic disk 12, a latch mechanism 20 for holding the head actuator 14 at an evacuate position when a shock and the like act on the HDD, and a board unit 17 on which electronic parts such as a preamplifier, a head IC, and the like are mounted.

A control circuit substrate 25 is fixed on an outer surface of base 10a by screws and positioned in confrontation with a bottom wall of the base 10a. The control circuit substrate 25 controls the operation of the spindle motor 13, the VCM 16, and the magnetic heads 33 via the board unit 17.

As shown in FIG. 1, the magnetic disk 12 is coaxially engaged with a hub of the spindle motor 13, clamped by a clamp spring 15 fixed to an upper end of the hub by screw, and fixed to the hub. The magnetic disk 12 is rotated by the spindle motor 13 as a drive motor at a predetermined speed in the direction of an arrow B.

The head actuator 14 comprises a bearing unit 24 fixed on the bottom wall of the base 10a and plural arms 27 extending from the bearing unit 24. The arms 27 are positioned in parallel with a surface of the magnetic disk 12 with predetermined intervals from each other and extend from the bearing unit 24 in the same direction. The head actuator 14 includes elastically deformable elongated plate-shaped suspensions 30. Each of the suspensions 30 includes a plate spring and a base end thereof is fixed to an extreme end of the arm 27 by spot welding or bonding and extends from the arm.

Each suspension 30 may be formed integrally with a corresponding arm 27. The magnetic head 33 is supported on the extending end of each suspension 30. A head suspension is configured by the arms 27 and the suspensions 30, and a head suspension assembly is configured by the head suspension and the magnetic heads 33.

As illustrated in FIG. 2, each magnetic head 33 comprises a substantially rectangular parallelepiped slider 42 and a recording/reproducing head section 44 disposed to an outflow end (trailing end) of the slider. The magnetic head 33 is fixed to a gimbal spring 41 disposed to extreme end of the suspension 30. The respective magnetic heads 33 are applied with a head load L toward a surface of the magnetic disk 12 by the elasticity of the suspensions 30. The two arms 27 are positioned in parallel with each other with the predetermined intervals, and the suspensions 30 and the magnetic heads 33 attached to the arms are located both surface sides of the magnetic disk 12.

The magnetic head 33 is electrically connected to a main FPC 38 to be described later via a relay flexible print circuit board (relay FPC) 35 fixed on the arm 27 and suspension.

As illustrated in FIG. 1, the board unit 17 includes an FPC main body 36 formed of a flexible print circuit board and the main FPC 38 extending from the FPC main body. The FPC main body 36 is fixed on the bottom surface of the base 10a. The electronic parts including the preamplifier 37 and the head IC are mounted on the FPC main body 36. An extending end of the main FPC 38 is connected to the head actuator 14 and connected to the magnetic heads 33 via the respective relay FPCs 35.

The VCM 16 includes an unillustrated support frame extending in a direction opposite to the arms 27 from the bearing unit 21 and a voice coil supported by the support frame. In a state that the head actuator 14 is assembled to the base 10a, the voice coil is positioned between a pair of yokes 34 fixed on the base 10a and constitutes the VCM 16 together with the yokes and magnets fixed to the yokes.

The head actuator 14 is rotated by energizing the voice coil of the VCM 16 in a state that the magnetic disk 12 rotates, and the magnetic heads 33 are moved onto desired tracks of the magnetic disk 12 and positioned thereon. At this time, the magnetic heads 33 are moved between an inner peripheral edge and an outer peripheral edge of the magnetic disk 12 in the radial direction of the magnetic disk.

Next, a configuration of the magnetic disk 12 and the magnetic head 33 will be explained in detail. FIG. 3 is an enlarged sectional view showing the head section 44 of each magnetic head 33 and the magnetic disk.

As shown in FIGS. 1 to 3, the magnetic disk 12 comprises a substrate 101 including, for example, a non-magnetic body having a diameter of about 2.5 inches and formed in a disk shape. Sequentially laminated on each surface of the substrate 101 are a soft magnetic layer 102 including a material exhibiting soft magnetic characteristics as an under-layer, a magnetic recording layer 103 having a magnetic anisotropy in a direction perpendicular to a disk surface on the soft magnetic layer 102, and a protection film layer 104 on the magnetic recording layer 103.

As illustrated in FIGS. 2 and 3, the magnetic head 33 is configured as a flying type head and comprises the slider 42 formed in a substantially rectangular parallelepiped shape and the head section 44 formed in the outflow end (trailing) side of the slider. The slider 42 is formed of, for example, a sintered body (ALTIC) of alumina and titanium carbide, and the head section 44 is formed by laminating a thin film.

The slider 42 has a rectangular disk-facing surface (air bearing surface (ABS)) 43 facing the surface of the magnetic disk 12. The slider 42 is caused to fly by an air flow C generated between the disk surface and the disk-facing surface 43 by the rotation of the magnetic disk 12. The direction of the air flow C coincides with the rotation direction B of the magnetic disk 12. The slider 42 is located above the surface of the magnetic disk 12 so that a longitudinal direction of the disk facing surface 43 substantially matches the direction of the air flow C.

The slider 42 includes a leading end 42a positioned on an inflow side of the air flow C and a trailing end 42b positioned on an outflow side of the air flow C. In the disk facing surface 43 of the slider 42, a not-shown leading step, trailing step, side step, negative pressure cavity and the like are formed.

As shown in FIG. 3, the head section 44 comprises a reproducing head 54 and a recording head 58 each formed by a thin film process at the trailing end 42b of the slider 42, and is formed as a separating type magnetic head.

The reproducing head 54 comprises a magnetic film 55 exhibiting a magnetoresistive effect and shield films 56, 57 arranged on a trailing side and a leading side of the magnetic film 55 to sandwich the magnetic film 55 therebetween. Lower ends of the magnetic film 55 and the shield films 56, 57 are exposed to the disk-facing surface 43 of the slider 42.

Figure 4:
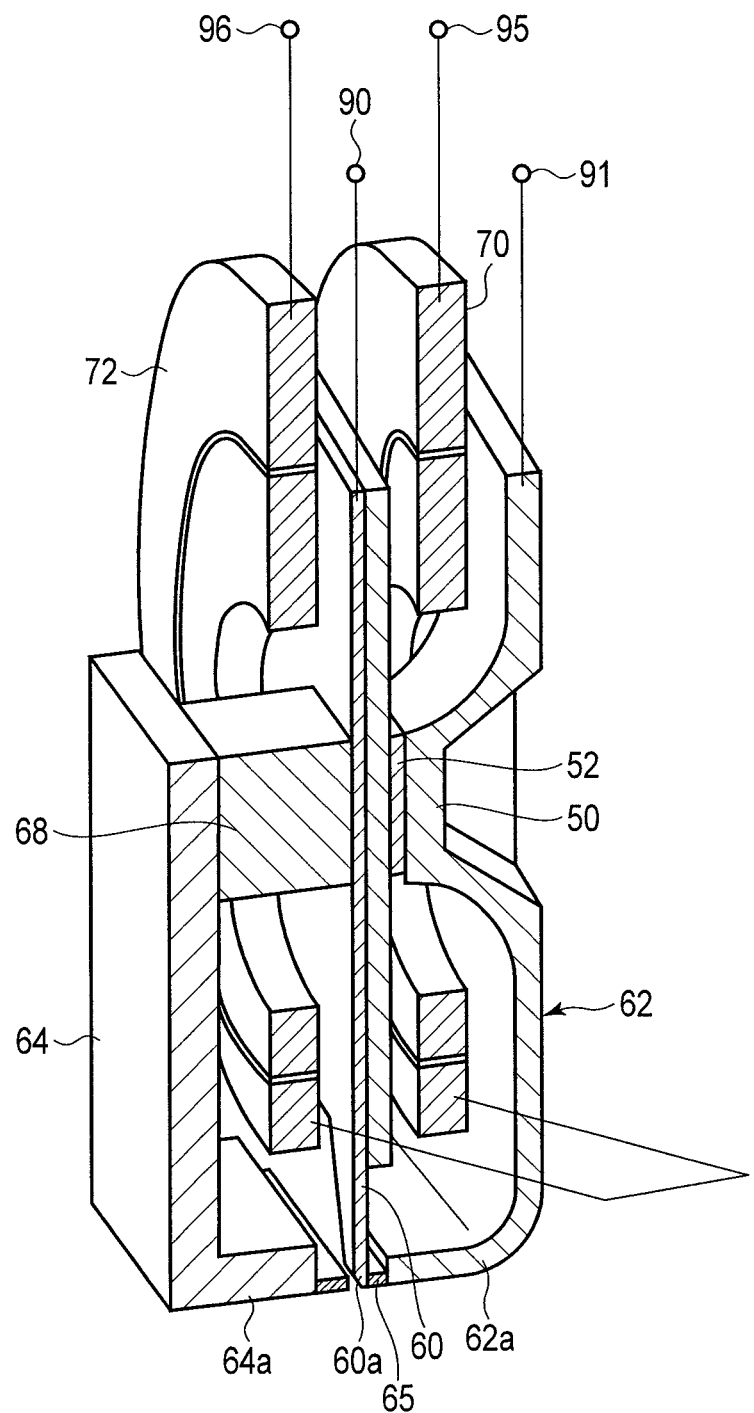
FIG. 4 is a perspective view schematically illustrating a recording head of the magnetic head.

The recording head 58 is provided on the side of the trailing end 42b of the slider 42 with respect to the reproducing head 54. FIG. 4 is a perspective view schematically showing the recording head 58 and the magnetic disk 12, and FIG. 5 is an enlarged side view showing a main pole distal end portion and a side shield portion of a recording head part.

As illustrated in FIG. 3 to FIG. 5, the recording head 58 comprises a main magnetic pole 60 made of a soft magnetic material having a high permeability and a high saturated magnetic flux density, to generate a recording magnetic field in a direction perpendicular to the surface of the magnetic disk 12; a trailing shield 62; and a leading shield 64. The main magnetic pole 60 and trailing shield 62 constitute a first magnetic core for forming a magnetic path, and the main magnetic pole 60 and leading shield 62 constitute a second magnetic core for forming a magnetic path. The recording head 58 comprises a first coil 70 wound around the first magnetic core and a second coil 72 wound around the second magnetic core.

The main magnetic pole 60 extends approximately perpendicularly to the surface of the magnetic disk 12. An extreme end 60a of the main magnetic pole 60 on the magnetic disk 12 side is gradually reduced in size toward the disk surface. The extreme end 60a of the main magnetic pole 60 has a trailing side end surface, which has a cross section formed in, for example, a trapezoid, is positioned on a trailing end side, and has a predetermined width, a leading side end surface, which faces the trailing end surface and has a width narrower than the trailing side end surface, and both side surfaces. An extreme end surface of the main magnetic pole 60 is exposed to the disk-facing surface 43 of the slider 42. The width of a trailing side end surface of the extreme end 60a approximately corresponds to the width of a track in the magnetic disk 12.

The trailing shield 62 formed of a soft magnetic body is disposed on the trailing side of the main magnetic pole 60 and disposed to efficiently close the magnetic path via the soft magnetic layer 102 just under the main magnetic pole. The trailing shield 62 is formed in an approximately L-shape and has a first junction 50 connected to the main magnetic pole 60 and a second junction to be described later. The first junction 50 is connected to an upper portion of the main magnetic pole 60, i.e. connected to an upper portion away from the disk-facing surface 43 via a non-conductor 52.

An extreme end 66a of the trailing shield 62 is formed in an elongate rectangular shape and an extreme end surface thereof is exposed to the disk-facing surface 43 of the slider 42. A leading side end surface 66b of the extreme end 66a extends in a track width direction of the magnetic disk 12. The leading side end surface 66b confronts a trailing side end surface 67a of the main magnetic pole 60 in parallel at a write gap WG therebetween.

A non-magnetic conductor layer 65 is interposed between the extreme end 60a of the main magnetic pole 60 and the leading side end surface 66b of the trailing shield 62 in the vicinity of the disk-facing surface 43 so as to electrically joint the extreme end 60a to the leading side end surface 66b. An extreme end 62a of the trailing shield 62 constitutes the second junction. The non-magnetic conductor layer 65 may be any of a single layer structure or a multilayer structure in which plural non-magnetic conductive layers are laminated. Cu, Ag, Au, Al, Nichrome, Ta, Ru, and the like can be used as a material of the non-magnetic conductor layer 65.

As illustrated in FIGS. 3 and 5, in the embodiment, the non-magnetic conductor layer 65 includes a high-frequency oscillator, for example, a spin torque oscillator 74. That is, the spin torque oscillator 74 is located on a trailing side of the main magnetic pole 60 adjacent to the main magnetic pole and positioned in the write gap WG. The spin torque oscillator 74 is configured by sequentially laminating a cap layer, an oscillation layer (first magnetic body layer) 74a, an intermediate layer, a spin injection layer (second magnetic body layer), and an under-layer from the main magnetic pole 60 side to the trailing shield 62 side. The respective layers extend approximately perpendicularly to the disk-facing surface 43. These layers may be laminated in an order opposite to the above order.

Terminals 91, 92 are connected to the main magnetic pole 60 and the trailing shield 62, and a power supply 94 is connected to the terminals 91, 92. A current circuit is configured so that a current Iop can be supplied from the power supply 94 in series through the main magnetic pole 60, the non-magnetic conductor layer 65, and the trailing shield 62.

As shown in FIGS. 3 and 4, the recording head 58 has the first coil (recording coil) 70 which is wound around the magnetic path including the main magnetic pole 60 and the trailing shield 62 to cause a magnetic flux to flow to the main magnetic pole 60 when the recording head 58 writes a signal to the magnetic disk 12. The first coil 70 is wound around the first junction 50 between, for example, the main magnetic pole 60 and a return magnetic pole 66.

As shown in FIGS. 3 to 5, the leading shield 64 formed of a soft magnetic body is located on the leading side of the main magnetic pole 60 in confrontation with the main magnetic pole. The leading shield 64 is formed in an approximately L-shape and an extreme end 64a on the magnetic disk 12 side is formed in an elongated rectangular shape. An extreme end surface (lower end surface) of the extreme end 64*a* is exposed to the disk-facing surface 43 of the slider 42. A trailing side end surface 64*b* of the extreme end 64*a* extends along the track width direction of the magnetic disk 12. The trailing side end surface 64*b* confronts a leading side end surface of the main magnetic pole 60 in parallel with a gap therebetween. A protection insulation film as a non-magnetic body to be described later is positioned in the gap.

The leading shield 64 has a first junction 68 joined to the main magnetic pole 60 at a position away from the magnetic disk 12. The first junction 68 is formed of, for example, a soft magnetic body and constitutes a magnetic circuit together with the main magnetic pole 60 and the leading shield 64. The recording head 58 comprises the second coil 72 which is wound around the magnetic path including the main magnetic pole 60 and the leading shield 64 and apples a magnetic field to the magnetic circuit. The second coil 72 is wound around the first junction 68 between, for example, the main magnetic pole 60 and the leading shield 64. Note that a non-conductor a non-magnetic body may be inserted into a part of the first junction 68.

The second coil 72 is wound in a direction opposite to the first coil 70. Terminals 95, 96 are connected to the first coil 70 and the second coil 72, respectively, and a second power supply 98 is connected to the terminals 95, 96. Further, the second coil 72 is connected in series to the first coil 70. Note that the first coil 70 and the second coil 72 may be controlled so as to be separately supplied with a current. The current supplied to the first coil 70 and the second coil 72 is controlled by a control unit of the HDD.

In the recording head 58 described above, a soft magnetic material that constitutes the main magnetic pole 60, the trailing shield 62, and the leading shield 64 can be selected from an alloy or a compound containing at least one of Fe, Co, or Ni and used.

As illustrated in FIG. 3, the reproducing head 54 and the recording head 58 is covered with a protection insulation film 76 except for a portion exposed to the disk-facing surface 43 of the slider 42. The protection insulation film 76 constitutes an outer shape of the head section 44.

According to the HDD configured as described above, the head actuator 14 is rotated by driving the VCM 16, and the magnetic heads 33 are moved onto desired tracks of the magnetic disk 12 and positioned thereon. Further, the magnetic heads 33 are caused to fly by the air flow C generated between the disk surface and the disk-facing surface 43 by the rotation of the magnetic disk 12. When the HDD is operated, the disk-facing surface 43 of the slider 42 confronts the disk surface keeping intervals therebetween. As illustrated in FIG. 2, the magnetic head 33 flies in a tilt attitude so that the portion of the recording head 58 of the head section 44 becomes nearest to the surface of the magnetic disk 12. In this state, recorded information is read from the magnetic disk 12 by the reproducing head 54 and information is written to the magnetic disk 12 by the recording head 58.

When information is written, as illustrated in FIG. 3, a direct current is supplied from the power supply 94 to the main magnetic pole 60, the non-magnetic conductor layer 65 including the spin torque oscillator 74, and the trailing shield 62, a high-frequency magnetic field is generated from the spin torque oscillator 74, and the high-frequency magnetic field is applied to a magnetic recording layer 103 of the magnetic disk 12. Further, the main magnetic pole 60 is excited by the first coil 70 by causing an alternating current to flow from the power supply 98 to the first coil 70 and the second coil 72, and a recording magnetic field in the perpendicular direction is applied to the recording layer 103 of the magnetic disk 12 just under the main magnetic pole. With this operation, information is recorded to the magnetic recording layer 103 in a desired track width. Magnetic recording with a high holding force and high magnetic anisotropy energy can be executed by superimposing the high-frequency magnetic field to the recording magnetic field. Further, since a disturbance of a magnetic domain in the main magnetic pole 60 is eliminated and an effective magnetic path can be introduced by causing a current to flow from the main magnetic pole 60 to the trailing shield 62, a magnetic field generated from the extreme end of the main magnetic pole becomes strong.

At this time, a return magnetic field can be prevented from being concentrated just below the trailing shield 62 by exciting the leading shield 64 by causing a current to flow to the second coil 72 and causing a desired magnetic field to flow to a closed magnetic path including the main magnetic pole 60 and the trailing shield. That is, since the return magnetic field is dispersed also to the leading shield 64 by the magnetic field flowing to the closed magnetic circuit including the leading shield 64, the return magnetic field concentrated in the direction of the trailing shield 62 is suppressed.

From what has been described above, information already recorded in a record track can be suppressed from being degraded and erased. Accordingly, since the already recorded information can be prevented from being deteriorated and erased while securing a recording capability on a write track, it is possible to increase the track density of the recording layer of the magnetic disk 12 and to improve the recording density of the HDD.

Further, as illustrated in FIG. 5, the recording head 58 is configured such that the angle $\theta$ between a recording magnetic field E applied from the main magnetic pole 60 to the recording medium (the magnetic disk 12) and the disk-facing surface (ABS) 43 of the slider becomes 0 to 85° in the region between the trailing side end of the main magnetic pole 60 and the trailing side end of the spin torque oscillator 74 in a state that a high-frequency magnetic field is applied from the spin torque oscillator 74.

FIGS. 6A to 6H are views illustrating the frequency dependence of a reversal magnetic field (Hc) as to various angles $\theta$, respectively. A configuration used in calculation is as shown below next. A circular polarized high-frequency magnetic field 700 (Oe) including a component in parallel with the ABS was applied from a spin torque oscillator to a single recording medium particle that constitutes a magnetic recording medium (magnetic disk) that satisfies perpendicular magnetic anisotropy field Hk=16 kOe. At this time, the recording effective magnetic field intensity (Heff) at which a magnetic recording medium was reversed was used as the reversal magnetic field (Hc). Note that the relation between the recording magnetic field E and the recording effective magnetic field intensity (Heff) is shown by the following expression according to the Stoner-Wohlfarth model.

(ABS parallel component of recording magnetic field)$^{(2/3)}$+(ABS perpendicular component of recording magnetic field)$^{(2/3)}$=(intensity of recording effective magnetic field)$^{(2/3)}$ As illustrated in FIGS. 6B to 6H, when the angle $\theta$ between the recording magnetic field E and the disk-facing surface (ABS) 43 is 0-85°, the frequency of a high-frequency magnetic field corresponds to the reversal magnetic field (Hc) at 1:1. That is, a predetermined reversal magnetic field corresponds to a certain frequency. Accordingly, a desired reversal magnetic field can be generated by controlling the frequency of the high-frequency magnetic field.

In contrast, as illustrated in FIG. 6A, when the angle $\theta$ is 90°, since the reversal magnetic field bites inside in the range of the frequency of the high-frequency magnetic field from 12 to 15 GH, a region, in which the reversal magnetic field (Hc) becomes unstable at a frequency, occurs. That is, reversal magnetic fields having plural magnitudes are generated at a certain frequency.

Figure 7A:
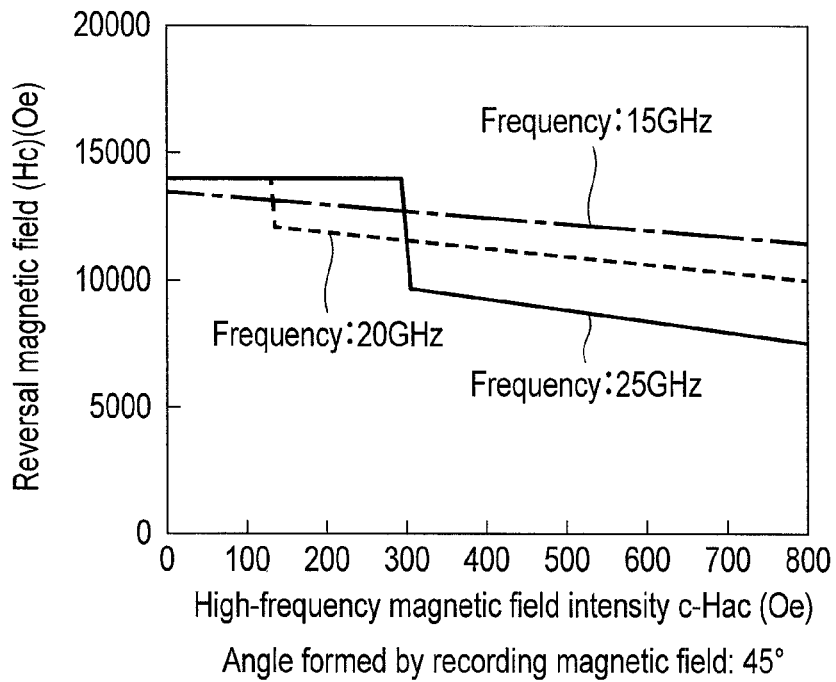
FIG. 7A is a view illustrating the relation between a reversal magnetic field and a high-frequency magnetic field intensity (c-Hac) when a recording magnetic field has an angle of 45°.
Figure 7B:
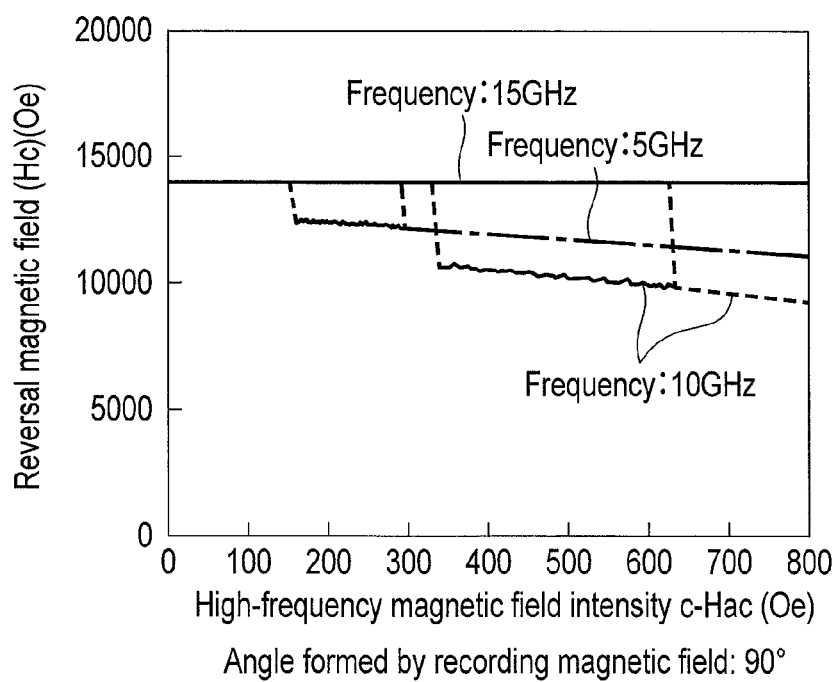
FIG. 7B is a view illustrating the relation between a reversal magnetic field and a high-frequency magnetic field intensity (c-Hac) when a recording magnetic field has an angle of 90°.

FIG. 7A and FIG. 7B illustrate the relation between the reversal magnetic field and the high-frequency magnetic field intensity (c-Hac) for two angles θ (θ=45°, θ=90°). As shown in FIG. 7A, when the angle θ between the recording magnetic field E and the ABS is 45°, the medium effective magnetic field corresponds to the high-frequency magnetic field intensity at 1:1. In contrast, when the angle θ is 90°, as illustrated in FIG. 7B, the reversal magnetic field (Hc) becomes unstable when the frequency is 10 GHz and the high-frequency magnetic field intensity (c-Hac) is in the range of 330-6300 (Oe). That is, when a recording medium magnetization is reversed using the region, magnetization transition position becomes unstable.

FIG. 8A shows the recording effective magnetic field intensity (Heff) by the recording head 58 of the embodiment, the high-frequency magnetic field intensity (c-Hac) by the spin torque oscillator 74, and the profile of the reversal magnetic field (Hc) along a down track direction. Further, FIG. 8B shows the distribution of the angles formed by the recording magnetic field E along the down track direction.

Note that, in FIGS. 8A and 8B, an end of the main magnetic pole 60 is positioned at a location of 0 nm in the down track direction and extends in a negative direction. An end of the trailing shield 62 is positioned at a location of 50 nm and extends in a positive direction. The oscillation layer (first magnetic body layer) 74a of the spin torque oscillator 74 is positioned at a location of 10 nm-23 nm.

From FIGS. 8A and 8B, in the recording head 58, since the recording effective magnetic field intensity (Heff) becomes larger than the reversal magnetic field (Hc) in a wide region, good saturation recording becomes possible. Further, a portion where the recording effective magnetic field intensity (Heff) intersects the reversal magnetic field (Hc) corresponds to the transition point of the medium magnetization. Since the recording effective magnetic field intensity (Heff) intersects the reversal magnetic field (Hc) at a point, a high linear recording density with a short transition length can be realized. Further, as illustrated in FIG. 8B, the distribution of the angles θ formed between the recording magnetic field E and the ABS becomes 0-85° between from the end of the main magnetic pole to the end of the spin torque oscillator.

FIG. 8C is a view illustrating the recording effective magnetic field intensity (Heff) by the recording head 58 of the embodiment, the high-frequency magnetic field intensity (c-Hac) by the spin torque oscillator 74, and the profile of the reversal magnetic field (Hc) along the down track direction when it is assumed that the angle θ between the recording magnetic field E and the ABS is 90° as a comparative example. It can be found that when the angle θ is 90°, the unstable reversal magnetic field region intersects the recording effective magnetic field intensity (Heff) and the transition length becomes long.

Next, a transition length in high-frequency assisted recording was quantitatively calculated by the following method.

First, a calculation method of a high-frequency assisted recording effective magnetic field will be explained. The high-frequency assisted recording effective magnetic field was calculated as follows taking it into consideration that an ordinary recording effective magnetic field intensity (Heff) corresponded to a maximum medium Hk that could be reversed. That is, when the angles formed between the high-frequency magnetic field intensity (c-Hac), the recording effective magnetic field intensity (Heff), and the recording magnetic field E and a medium easy axis, and a frequency were given, the maximum medium Hk that could be reversed under the condition was used as the high-frequency assisted recording effective magnetic field. Note that, in the high-frequency assisted recording, the reversal magnetic field may become unstable depending on the angle formed between the recording magnetic field and the medium easy axis. In the case, two types of Hk, i.e., Hk that was to be began reversal and Hk that had been perfectly reversed were determined and used as the high-frequency assisted recording effective magnetic field.

Next, as shown in FIG. 9, the distribution of the high-frequency assisted recording effective magnetic fields in the down track direction was calculated. The reversal of a magnetization of the recording medium started from the nucleation field (HnO) at the time of recording and ended in the saturation field (HsO) at the time of recording. The magnetization state of a medium became unstable between from the position of HnO to the position of Hs0. Thus, the transition length (Trans50) was made to equal half the distance from the position of Hn0 to the position of HsO. Note that, in the high-frequency assisted recording, the reversal magnetic field might become unstable depending on the angle between the effective magnetic field and the medium easy axis. Accordingly, the transition length (Trans50) was evaluated obtaining a region in which a nucleus was certainly created and saturated.

Figure 10:
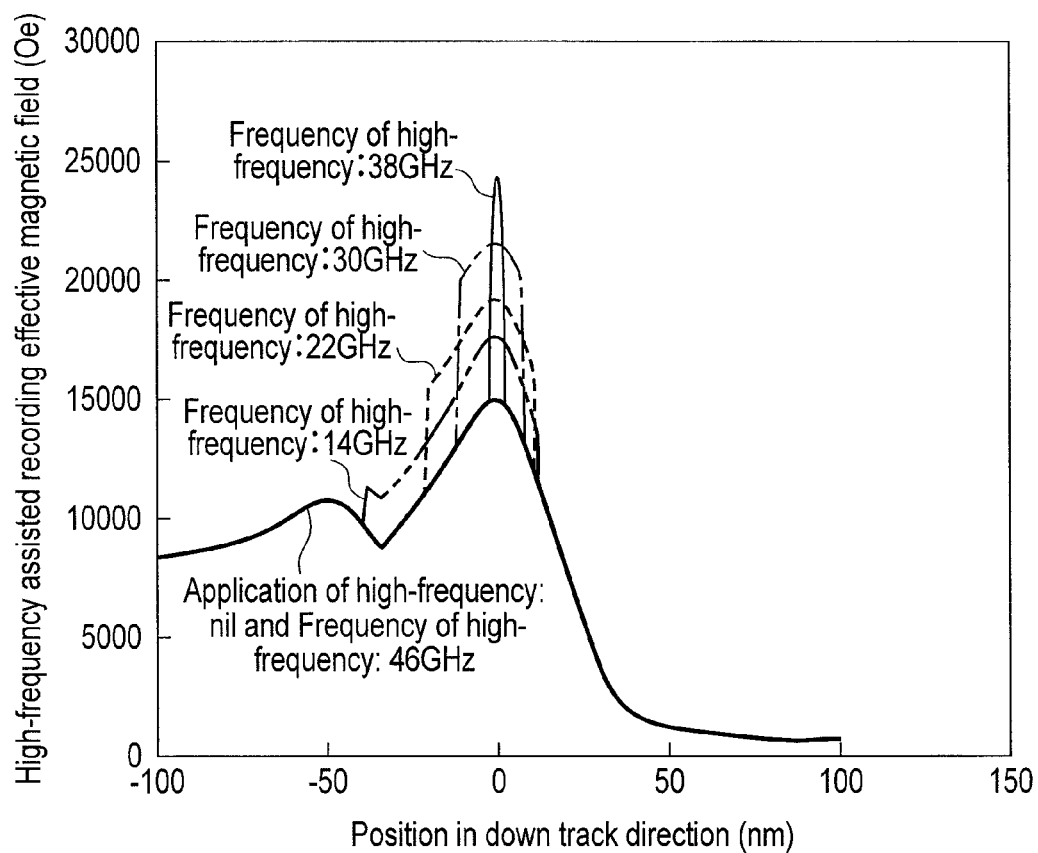
FIG. 10 is a view illustrating a result of specific calculation of the distribution of the high-frequency assisted recording magnetic fields in the down track direction regarding plural frequencies of a high-frequency.

FIG. 10 illustrates a result of specific calculation of the distribution of high-frequency assisted recording magnetic fields in the down track direction. The configuration of a recording head used for the calculation is as follows. The distance (WG) between a main magnetic pole and a trailing shield is set to 35 nm and a spin torque oscillator is interposed between the main magnetic pole and the trailing shield. The spin torque oscillator has an oscillation layer (FGL) in which a magnetization is rotated and a spin injection layer (SIL) into which a spin is ejected. The oscillation layer has a film thickness of 13 nm and a saturation magnetic flux density of 2.3 T. The distance from a surface of the oscillation layer to the main magnetic pole is set to 5 nm.

As shown in FIG. 10, when no high frequency is applied, an effective magnetic field has a maximum value of 15 kOe. As the frequency of a high-frequency is increased, the maximum value of a high-frequency assisted recording effective magnetic field is increased and when the frequency of a high-frequency is 38 GHz, the maximum value becomes 24 kOe. When a frequency is 46 GHz or more, since the frequency does not agree with a medium resonance condition, the high-frequency assisted recording effective magnetic field becomes the same as an ordinary effective magnetic field (no high frequency is applied).

FIG. 11 illustrates a result of determination of the relation between a transition length (Trans50) and the frequency of a high-frequency determined using a recording medium having nucleation field (HnO)=13 kOe and saturation field (HsO)=17 kOe. When the distance from a surface of the oscillation layer (FGL) of the spin torque oscillator to the main magnetic pole (MP) is 5 nm, the transition length (Trans50) can be reduced to a minimum of 1.3 nm by setting the frequency of the high-frequency to 26 GHz. Note that, it can be found that the best transition length (Trans50) is 3 nm in an ordinary magnetic recording head which uses no high-frequency assisted recording, and the transition length (Trans50) can be improved by the high-frequency assisted recording head. In the ordinary magnetic recording head, although the transition length (Trans50) can be reduced by reducing the distance (WG) between the main magnetic pole and the trailing shield, when the distance is excessively reduced, since the maximum value of an effective magnetic field becomes small, the transition length (Trans50) is deteriorated. Accordingly, an optimum write gap WG exists.

Note that FIG. 11 additionally describes a result when the position of the oscillation layer (FGL) is moved. In any of the cases, the transition length (Trans50) is minimized between a frequency of 20 GHz to a frequency of 30 GHz.

FIG. 12 is a view illustrating the dependence between a minimum transition length (Trans50) and the distance from a surface of the oscillation layer (FGL) 74a to the main magnetic pole. When the distance from the FGL surface to the main magnetic pole is between 0 nm and 15 nm, the transition length (Trans50) exhibits a good result of 2.0 nm or less. In contrast, when the distance from the FGL surface to the main magnetic pole is 20 nm or more, since the superposition of the high-frequency magnetic field and the effective magnetic field is deteriorated, the transition length (Trans50) is abruptly deteriorated. Accordingly, the distance from the FGL surface to the main magnetic pole is preferably set to 0-15 nm.

FIG. 13A to FIG. 13C illustrate the relation between the dependence of a reversal magnetic field on the frequency of a high-frequency magnetic field and a recording magnetic field application time. It can be found that when the application time is 0.05 ns as illustrated in FIG. 13A, although an assist region is small, when the application time is set to 0.1 ns or more as illustrated in FIGS. 13B and 13C, the assist region is enlarged and a magnetization is stably reversed. That is, when an application time to a recording medium particle in a magnetization transition region is taken into consideration, it is preferable to achieve an average magnetic body particle size of recording medium/peripheral speed 0.1 ns. One-bit particle may be used as the magnetic body particle. Further, a granular medium may be also used as the recording medium.

FIG. 14 is a view illustrating the relation between the oscillation frequency f of an assist-maximized spin torque oscillator standardized by a reversal magnetic field (HcO) without a high-frequency assist by a spin torque oscillator and a high-frequency magnetic field intensity (c-Hac) standardized by HcO as to various angles θ. It can be found that when the standardized oscillation frequency f is 0.35-0.8, that is, when (0.35<f/(γ×HcO)<0.8) and γ=2.88 GHz/kOe are achieved, a maximum assist is obtained. As mentioned above, when the angle θ of the recording magnetic field is 15-85°, the transition length (Trans50) between bits can be reduced by setting the oscillation frequency f to 0.35-0.8.

As described above, according to the magnetic recording head and the HDD according to the embodiment, an inter-bit transition length can be reduced and a line recording density can be improved by setting, in the high-frequency assisted recording head, the angle θ formed between the recording magnetic field applied from the recording head to the recording medium and the disk-facing surface (ABS) to 0-85° in a record magnetization transition region, setting the oscillation frequency of the spin torque oscillator standardized by the reversal magnetic field (HcO) without assist to 0.35-0.8, and further achieving medium average magnetic body particle size/peripheral speed ≥0.1 ns in the recording layer of the recording medium. As a result, a recording head capable of further improving a recording density and a magnetic recording apparatus including the recording head can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the material, shape, size, and the like of the components that constitute the head section can be changed when necessary. Further, in the magnetic disk apparatus, the number of the magnetic disks and the magnetic heads can be increased when necessary and the size of the magnetic disk can be variously selected.

What is claimed is:

1. A magnetic recording head comprising:
   a facing surface configured to face a recording medium;
   a main magnetic pole including an extreme end exposed to the facing surface and configured to apply a recording magnetic field to a recording layer of the recording medium; and
   a high-frequency oscillator disposed near to a trailing side of the main magnetic pole and configured to apply a high-frequency magnetic field to the recording layer;
   wherein an angle defined between a recording magnetic field applied from the main magnetic pole to the recording medium and the facing surface is 0 to 85° in a region between a trailing side end of the main magnetic pole and a trailing side end of the high-frequency oscillator, and
   when a reversal magnetic field, at the time the high-frequency oscillator does not oscillate a high-frequency magnetic field, is shown by HcO, a oscillation frequency f (GHz) of the high-frequency oscillator is:

$$0.35 < f/(\gamma \times HcO) < 0.8, \gamma = 2.88 \text{ GHz/kOe}.$$

2. The magnetic recording head of claim 1, wherein the high-frequency oscillator comprises an oscillation layer, and a distance from a surface of the oscillation layer to the main magnetic pole is 0 to 15 nm.

3. The magnetic recording head of claim 2, which further comprises a trailing shield opposed to the trailing side of the main magnetic pole with a write gap, connected to the main magnetic pole via a non-conductor, and configured to form a first magnetic core together with the main magnetic pole, and a first coil wound around the first magnetic core.

4. The magnetic recording head of claim 3, which further comprises a leading shield opposed to a leading side of the main magnetic pole with a gap, connected to the main magnetic pole via a magnetic body, and configured to form a second magnetic core together with the main magnetic pole, and a second coil configured to be wound around the second magnetic core.

5. The magnetic recording head of claim 1, which further comprises a trailing shield opposed to the trailing side of the main magnetic pole with a write gap, connected to the main magnetic pole via a non-conductor, and configured to form a first magnetic core together with the main magnetic pole, and a first coil wound around the first magnetic core.

6. The magnetic recording head of claim 5, which further comprises a leading shield opposed to a leading side of the main magnetic pole with a gap, connected to the main magnetic pole via a magnetic body, and configured to form a second magnetic core together with the main magnetic pole, and a second coil configured to be wound around the second magnetic core.

7. A magnetic recording apparatus comprising:
a recording medium comprising a magnetic recording layer having a magnetic anisotropy in a direction perpendicular to a medium surface;
a drive unit configured to rotate the recording medium, and
a magnetic recording head of claim 1 configured to process information on the recording medium.

8. The magnetic recording apparatus of claim 7, wherein a ratio of a magnetic body particle size of the magnetic recording layer to a peripheral speed of the recording medium is 0.1 ns or more.

9. A magnetic recording head comprising:
a facing surface configured to face a recording medium;
a main magnetic pole including an extreme end exposed to the facing surface and configured to apply a recording magnetic field to a recording layer of the recording medium;
a high-frequency oscillator disposed near to a trailing side of the main magnetic pole and configured to apply a high-frequency magnetic field to the recording layer;
a trailing shield opposed to the trailing side of the main magnetic pole with a write gap, connected to the main magnetic pole via a non-conductor, and configured to form a first magnetic core together with the main magnetic pole; and
a first coil wound around the first magnetic core;
wherein an angle defined between a recording magnetic field applied from the main magnetic pole to the recording medium and the facing surface is 0 to 85° in a region between a trailing side end of the main magnetic pole and a trailing side end of the high-frequency oscillator.

10. The magnetic recording head of claim 9, which further comprises a leading shield opposed to a leading side of the main magnetic pole with a gap, connected to the main magnetic pole via a magnetic body, and configured to form a second magnetic core together with the main magnetic pole, and a second coil configured to be wound around the second magnetic core.

11. The magnetic recording head of claim 9, wherein when a reversal magnetic field, at the time the high-frequency oscillator does not oscillate a high-frequency magnetic field, is shown by HcO, a oscillation frequency f (GHz) of the high-frequency oscillator is:

$0.35 < f/(\gamma \times HcO) < 0.8, \gamma = 2.88$ GHz/kOe.

12. A magnetic recording apparatus comprising:
a recording medium comprising a magnetic recording layer having a magnetic anisotropy in a direction perpendicular to a medium surface;
a drive unit configured to rotate the recording medium; and
a magnetic recording head configured to process information on the recording medium, the magnetic recording head comprising
a facing surface configured to face a recording medium;
a main magnetic pole including an extreme end exposed to the facing surface and configured to apply a recording magnetic field to a recording layer of the recording medium; and
a high-frequency oscillator disposed near to a trailing side of the main magnetic pole and configured to apply a high-frequency magnetic field to the recording layer;
wherein an angle defined between a recording magnetic field applied from the main magnetic pole to the recording medium and the facing surface is 0 to 85° in a region between a trailing side end of the main magnetic pole and a trailing side end of the high-frequency oscillator.

13. The magnetic recording apparatus of claim 12, wherein a ratio of a magnetic body particle size of the magnetic recording layer to a peripheral speed of the recording medium is 0.1 ns or more.

14. The magnetic recording apparatus of claim 12, wherein when a reversal magnetic field, at the time the high-frequency oscillator does not oscillate a high-frequency magnetic field, is shown by HcO, a oscillation frequency f (GHz) of the high-frequency oscillator is:

$0.35 < f/(\gamma \times HcO) < 0.8, \gamma = 2.88$ GHz/kOe.

* * * * *